(12) United States Patent
Geckler et al.

(10) Patent No.: US 9,771,917 B2
(45) Date of Patent: Sep. 26, 2017

(54) VARIABLE IGNITION ENERGY MANAGEMENT

(71) Applicant: Cummins Inc., Columbus, IN (US)

(72) Inventors: Samuel C. Geckler, Columbus, IN (US); David Stroh, Columbus, IN (US); Steven J. Kolhouse, Columbus, IN (US)

(73) Assignee: Cummins Inc., Columbus, IN (US)

(*) Notice: Subject to any disclaimer, the term of this patent is extended or adjusted under 35 U.S.C. 154(b) by 250 days.

(21) Appl. No.: 14/506,223

(22) Filed: Oct. 3, 2014

(65) Prior Publication Data
US 2016/0097367 A1 Apr. 7, 2016

(51) Int. Cl.
*F02P 9/00* (2006.01)
*F02D 41/00* (2006.01)
(Continued)

(52) U.S. Cl.
CPC ............ *F02P 9/002* (2013.01); *F02D 41/005* (2013.01); *F02D 41/0085* (2013.01);
(Continued)

(58) Field of Classification Search
CPC .... F02D 41/005; F02D 41/0085; F02D 41/34; F02D 41/36; F02D 43/00;
(Continued)

(56) References Cited

U.S. PATENT DOCUMENTS

| 4,255,789 A | 3/1981 | Hartford et al. |
| 4,559,915 A * | 12/1985 | Naganawa .......... F02D 41/1475 123/406.47 |

(Continued)

FOREIGN PATENT DOCUMENTS

| DE | 4218404 | 12/1993 |
| DE | 102007029953 | 1/2009 |

(Continued)

OTHER PUBLICATIONS

International Search Report and Written Opinion for related International Application No. PCT/US2015/051094, dated Dec. 14, 2015, 10 pgs.

(Continued)

*Primary Examiner* — Carlos A Rivera
*Assistant Examiner* — Carl Staubach
(74) *Attorney, Agent, or Firm* — Faegre Baker Daniels LLP (57) ABSTRACT

A system, method, and engine control module for energy ignition management of a combustion engine. The method may be performed by the system or the engine control module. The method includes determining operating conditions of the combustion engine, setting ignition energy characteristics for a dedicated EGR cylinder and a non-dedicated EGR cylinder based on the operating conditions. The ignition energy characteristics include at least one of magnitude of energy, current, voltage, and ignition energy duration. At least one characteristic of the ignition energy characteristics for the non-dedicated EGR cylinder is different than a corresponding characteristic for the dedicated EGR cylinder. The method also includes energizing ignition aid plugs based on the ignition energy characteristics.

23 Claims, 4 Drawing Sheets

(51) Int. Cl.
  *F02P 13/00* (2006.01)
  *F02P 5/04* (2006.01)
  *F02P 5/15* (2006.01)
  *F02M 26/05* (2016.01)
  *F02M 26/43* (2016.01)
  *F02M 26/47* (2016.01)
  *F02M 26/46* (2016.01)

(52) U.S. Cl.
  CPC ............ *F02M 26/05* (2016.02); *F02M 26/43* (2016.02); *F02P 5/045* (2013.01); *F02P 5/1512* (2013.01); *F02P 13/00* (2013.01); *F02M 26/46* (2016.02); *F02M 26/47* (2016.02); *Y02T 10/46* (2013.01); *Y02T 10/47* (2013.01)

(58) Field of Classification Search
  CPC .......... F02M 25/0706; F02M 25/0747; F02M 25/0748; F02M 26/42; F02M 26/43; F02M 26/44; F02P 13/00; F02P 5/045; F02P 5/1512; F02P 9/002; F02P 5/1506; F02P 5/1516; F02P 6/00; F02P 15/00; F02P 15/02; F02P 16/08; F02P 16/12
  USPC .... 123/315, 406.11–406.55, 406.44, 406.76, 123/568.11–568.32; 60/605.2, 278, 279, 60/288; 701/101, 102, 103, 105, 108, 701/109, 113
  See application file for complete search history.

(56) References Cited

U.S. PATENT DOCUMENTS

| | | | |
|---|---|---|---|
| 5,701,865 | A | 12/1997 | Thomas et al. |
| 6,571,772 | B1* | 6/2003 | Ott .......................... F02N 19/00 123/481 |
| 7,401,603 | B1 | 7/2008 | Lepley |
| 7,472,687 | B2 | 1/2009 | Zhu et al. |
| 7,997,255 | B2 | 8/2011 | Asada et al. |
| 8,291,891 | B2 | 10/2012 | Alger, II et al. |
| 9,206,769 | B2* | 12/2015 | Burrahm ................ F02M 26/43 |
| 9,464,584 | B2* | 10/2016 | Gingrich ............. F02D 41/0065 |
| 2009/0114188 | A1* | 5/2009 | Peters .................... F02D 35/025 123/406.19 |
| 2009/0308070 | A1 | 12/2009 | Alger, II et al. |
| 2010/0206267 | A1 | 8/2010 | Glugla |
| 2010/0235070 | A1 | 9/2010 | Amano |
| 2011/0253100 | A1 | 10/2011 | Kaiser et al. |
| 2012/0204844 | A1 | 8/2012 | Gingrich et al. |
| 2012/0303247 | A1 | 11/2012 | Minami et al. |
| 2014/0190458 | A1* | 7/2014 | Gingrich .................. F02B 47/08 123/568.2 |
| 2014/0196702 | A1* | 7/2014 | Gingrich ............. F02D 41/0065 123/568.21 |
| 2014/0305416 | A1* | 10/2014 | Gukelberger .......... F02M 26/43 123/568.21 |
| 2015/0354477 | A1* | 12/2015 | Leone ..................... F02D 37/02 123/406.26 |
| 2015/0377188 | A1* | 12/2015 | Gingrich .................. F02B 61/00 60/278 |
| 2016/0047341 | A1* | 2/2016 | Styles .................... F02M 26/43 123/568.18 |
| 2016/0097366 | A1* | 4/2016 | Kolhouse ........... F02M 25/0754 123/568.12 |
| 2016/0102636 | A1* | 4/2016 | Styles .................... F02D 41/006 123/568.21 |
| 2016/0169186 | A1* | 6/2016 | Stroh ...................... F02P 9/002 123/406.48 |

FOREIGN PATENT DOCUMENTS

| | | |
|---|---|---|
| EP | 0305348 | 3/1989 |
| EP | 0640761 | 3/1995 |
| JP | S59126041 | 7/1984 |
| JP | 6002639 | 1/1994 |
| JP | 2000291519 | 10/2000 |
| WO | WO 2013/175091 | 11/2013 |
| WO | WO 2014/010246 | 1/2014 |

OTHER PUBLICATIONS

International Search Report and Written Opinion for related application PCT/US2015/053427, dated Jan. 7, 2016; 12 pages.

* cited by examiner

VARIABLE IGNITION ENERGY MANAGEMENT

FIELD OF THE INVENTION

The present invention relates generally to the field of ignition control for engines. More particularly, the present invention relates to methods and devices involving controlling spark energy in spark ignition engines.

BACKGROUND

Combustion engines include a plurality of cylinders. Ignition timing and fuel injection may be controlled equally or differently for each cylinder. But variations in manufacturing and use result in combustion variability between cylinders. Ignition timing may be varied to balance torque produced by the cylinders. The air/fuel ratio may also be controlled by controlling the fuel injectors.

Combustion engines may regenerate exhaust gas for efficiency or environmental reasons. Some cylinders may be dedicated to exhaust gas recirculation (EGR) while the exhaust gas from other cylinders, the non-dedicated cylinders, is not recirculated. The air/fuel ratio and EGR ratio may be controlled to achieve desirable combustion.

In view of the complexity of combustion engines with EGR, it would be desirable to provide additional control mechanisms to further improve the operation of combustion engines.

SUMMARY OF DISCLOSED EMBODIMENTS

Embodiments of the present invention provide devices and methods for variable ignition energy management for combustion engines. Such embodiments allow for adjustment of particular ignition energy characteristics for one or more cylinders of the combustion engine based on various engine operating conditions. The characteristics can include, but are not limited to, a total energy amount, timing, amplitude, duration and waveform shape, for example.

In one embodiment, a method for energy ignition management comprises determining operating conditions of a combustion engine including at least one dedicated EGR cylinder, a non-dedicated EGR cylinder, and ignition aid plugs configured to aid ignition in the at least one dedicated EGR cylinder and the non-dedicated EGR cylinder. The method further comprises setting ignition energy characteristics for the dedicated EGR cylinder and for the non-dedicated EGR cylinder based on the operating conditions, the ignition energy characteristics including at least one of magnitude of energy, current, voltage, waveform shape, and ignition energy duration, and excluding ignition timing. At least one characteristic of the ignition energy characteristics for the non-dedicated EGR cylinder is different than a corresponding characteristic for the dedicated EGR cylinder. The method further comprises energizing the ignition aid plugs based on the ignition energy characteristics.

In one variation thereof, the method further comprises setting ignition timing characteristics. In another variation thereof, the method further comprises setting a first target air/fuel ratio for the dedicated EGR cylinder; and setting the ignition energy characteristics for the dedicated EGR cylinder based on the first target air/fuel ratio. In a further variation thereof, the method further comprises setting a first target EGR fraction; and setting the ignition energy characteristics for the dedicated EGR cylinder based on a difference between the first target EGR fraction and a determined EGR fraction.

In another variation thereof, the method further comprises varying the ignition energy characteristics in response to a combustion engine load change. In another variation thereof, the method further comprises setting the ignition energy characteristics for the dedicated EGR cylinder based on a type of turbocharger of the combustion engine.

In embodiments of the combustion engine, the combustion engine comprises at least one dedicated exhaust gas recirculation (EGR) cylinder; a non-dedicated EGR cylinder; ignition aid plugs structured to aid ignition in the at least one dedicated EGR cylinder and the non-dedicated EGR cylinder; a plurality of sensors; and an ignition control unit structured to energize the ignition aid plugs based on ignition control signals. The combustion engine further comprises an engine control module electronically coupled to the sensors and to the ignition control unit. The engine control module includes an operating conditions determining module structured to determine operating conditions of the combustion engine using signals from the sensors; and an ignition energy setting module structured to set ignition energy characteristics for the dedicated EGR cylinder and the non-dedicated EGR cylinder based on the operating conditions. The ignition energy characteristics include at least one of magnitude of energy, current, voltage, waveform shape, and ignition energy duration, and exclude ignition timing. At least one characteristic of the ignition energy characteristics for the non-dedicated EGR cylinder are different than a corresponding ignition energy characteristic for the dedicated EGR cylinder. The engine control module also includes a communication module structured to transmit the ignition control signals to the ignition control unit. The ignition control signals are based on the ignition energy characteristics set by the ignition energy setting module.

In embodiments of the engine control module, the engine control module comprises an operating conditions determining module structured to determine operating conditions of the combustion engine using signals from the sensors; and an ignition energy setting module structured to set ignition energy characteristics for the dedicated EGR cylinder and the non-dedicated EGR cylinder based on the operating conditions. The ignition energy characteristics include at least one of magnitude of energy, current, voltage, waveform shape, and ignition energy duration, and exclude ignition timing. At least one characteristic of the ignition energy characteristics for the non-dedicated EGR cylinder are different than a corresponding ignition energy characteristic for the dedicated EGR cylinder. The engine control module also includes a communication module structured to transmit the ignition control signals to the ignition control unit. The ignition control signals are based on the ignition energy characteristics set by the ignition energy setting module.

Additional features, advantages, and embodiments of the present disclosure may be set forth from consideration of the following detailed description, figures, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE FIGURES

The accompanying figures illustrate embodiments of the present disclosure and, together with the detailed description, serve to explain the principles of the invention.

In the figures, like reference characters generally refer to like features (e.g., functionally similar and/or structurally similar elements).

DETAILED DESCRIPTION OF EMBODIMENTS OF THE DISCLOSURE

In the following detailed description, reference is made to the accompanying figures, which form a part hereof. The illustrative embodiments described herein are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be performed, arranged, substituted, combined, and designed in a wide variety of different configurations.

The embodiments described below relate to methods and devices for ignition energy management for engines. In such embodiments, ignition energy is managed by adjusting particular ignition energy characteristics, such as an amount of ignition aid energy, for one or more cylinders of a combustion engine based on various engine operating conditions. By way of illustration, the ignition energy characteristics may further include a total energy amount (or cumulative energy over the spark duration), timing, amplitude, duration, waveform shape, and number of energy pulses (multi-strike). The waveform shape may also represent strike duration and multi-strike ignition events. By controlling ignition energy characteristics according to a cylinder-by-cylinder approach, ignition energy may be optimized for each cylinder, which may result in longer ignition aid plug duration. At least some embodiments may realize significant engine performance improvements.

In some embodiments, the characteristics to be controlled on an individual cylinder basis may relate to exhaust gas recirculation ("EGR") techniques used in a vehicle. For example, in some embodiments, ignition energy characteristics may be modified based on an estimated EGR fraction per cylinder.

In a combustion engine having a plurality of cylinders, a determination of which cylinder is an igniting cylinder may be made so as to permit controlling of individual ignition aid plug timing for each of the plurality of cylinders. Controlling timing may be undertaken to enhance cylinder balancing, for example. Controlling timing differs from directly controlling the amount of energy associated with ignition of individual cylinders, however. Controlling the amount of energy directly—and not just the timing—can extend the lifetime of ignition aid plugs, as noted above.

Some embodiments allow for individualized control of the ignition energy characteristics for a plurality of cylinders. Other embodiments allow for a common adjustment of ignition energy for non-dedicated EGR cylinders. In both cases at least one ignition energy characteristic is adjusted in response to at least one engine operating condition. The engine operating conditions may include, but are not limited to, EGR fraction, EGR flow rate, EGR mapping, charge-air flow rate, lambda value corresponding to an air/fuel ratio, in-cylinder pressure, in-cylinder temperature, a knock detection metric, a misfire detection metric, a cylinder balancing determination, intake air temperature, an EGR quality metric, a gas quality metric, mass air flow rate, engine load, intake manifold temperature, coolant temperature, engine speed, a dual fuel mode, a substitution rate, whether the fuel injectors are configured as direct injectors or port injectors, ethanol boosting (dual fuel) for the direct injector and port injector configurations, water injection, a regeneration mode, a torque control, component age, e.g. ignition aid age and fuel injector age, ignition aid plug resistance, and transient characteristics such as time elapsed between events such as maintenance and regeneration events. The aforementioned operating conditions may be determined based on any combination of sensed values and/or estimated values. The ignition energy characteristics may be adjusted to control outputs including cylinder pressure, exhaust temperature, exhaust manifold pressure, exhaust oxygen content, combustion knock, misfires, cylinder balancing, and engine vibration levels.

Figure 1:
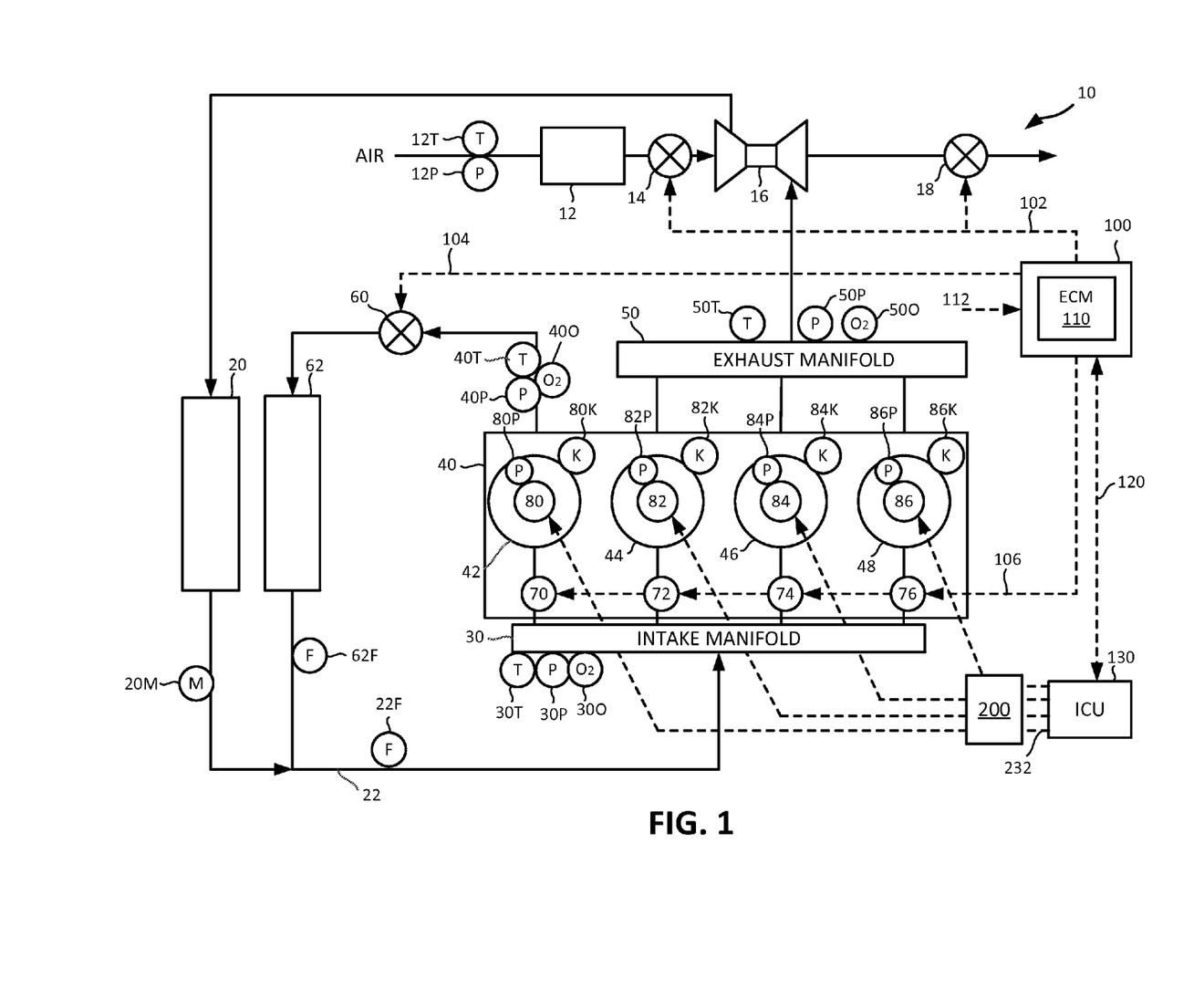
FIG. 1 is a schematic diagram of an embodiment of a variable energy management system.

Referring now to FIG. 1, an embodiment of a combustion engine 10 is shown including an intake manifold 30, a block 40, and an exhaust manifold 50. In the present embodiment, combustion engine 10 comprises a processing subsystem 100 including an engine control module (ECU) 110 configured to manage ignition energy provided to ignition aid plugs 80, 82, 84, and 86 to aid in the ignition of fuel delivered by fuel injectors 70, 72, 74, and 76 to combustion cylinders 42, 44, 46, and 48, where the fuel mixes with air and is ignited. Exemplary ignition aid plugs 80, 82, 84, and 86 include spark-plugs and glow-plugs. Exemplary fuel injectors 70, 72, 74, and 76 include direct fuel injectors, which inject fuel directly into combustion cylinders 42, 44, 46, and 48, and port injectors, which spray fuel into intake ports fluidly connected to combustion cylinders 42, 44, 46, and 48. Control subsystem 100 may include other control modules such as a transmission system control module, an exhaust system control module, a fuel supply system control module, and others.

In certain embodiments, ECM 110 is structured to perform certain operations, such us controlling the ignition aid plugs of the combustion engine. ECM 110 determines operating conditions of engine 10 based on measured parameters and operating models. Based on the operating parameters and desired performance, ECM 110 transmits ignition energy control signals 120 to an ignition control unit 130, which delivers ignition energy to ignition aid plugs 80, 82, 84, and 86 based on the ignition energy control signals. Operation of ignition control unit 130 is described in additional detail with reference to FIG. 2.

ECM 110 may be referred to herein as a "controller." In certain embodiments, the controller forms a portion of a processing subsystem including one or more computing devices having non-transient computer readable storage media, processors or processing circuits, and communication hardware. The controller may be a single device or a distributed device, and the functions of the controller may be performed by hardware and/or by processing instructions stored on non-transient machine readable storage media. Example processors include an application specific integrated circuit (ASIC), a field programmable gate array (FPGA), a digital signal processor (DSP), and a microprocessor including firmware. Example non-transient computer readable storage media includes random access memory (RAM), read only memory (ROM), flash memory, hard disk storage, electronically erasable and programmable ROM (EEPROM), electronically programmable ROM (EPROM), magnetic disk storage, and any other medium which can be used to carry or store processing instructions and data structures and which can be accessed by a general purpose or special purpose computer or other processing device.

In certain embodiments, the controller includes one or more modules structured to functionally execute the operations of the controller. Example modules, described with reference to FIG. 3, include an operating conditions determining module, an ignition energy setting module, a communication module, and an ignition timing module. The description herein including modules emphasizes the structural independence of certain aspects of the controller, and illustrates one grouping of operations and responsibilities of the controller. Other groupings that execute similar overall operations are understood to be within the scope of the present application. Modules may be implemented in hardware and/or as processing instructions on a non-transient computer readable storage medium. Modules may be distributed across various hardware or computer based components. Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an operational amplifier integrated circuit, analog control elements (springs, filters, integrators, adders, dividers, gain elements), and/or digital control elements.

Certain operations described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or pulse-width-modulation signal) indicative of the value, receiving a computer generated parameter indicative of the value, reading the value from a memory location on a non-transient machine readable storage medium, receiving the value as a run-time parameter by any means known in the art, and/or by receiving a value by which the interpreted parameter can be calculated, and/or by referencing a default value that is interpreted to be the parameter value.

Combustion engine 10 further comprises an exhaust system including exhaust manifold 50, which receives exhausted gases from combustion cylinders 44, 46, and 48, referred to herein as "non-dedicated EGR cylinders," and an exhaust gas recirculation (EGR) valve 60, which receives exhausted gases from combustion cylinder 42, referred to herein as a "dedicated EGR cylinder." EGR valve 60 may be controlled by ECM 110 via ECM valve control signals 104. In variations of the present embodiment, combustion engine 10 may comprise two or more dedicated EGR cylinders and additional non-dedicated EGR cylinders. Exhausted gases from the non-dedicated EGR cylinders drive an air-charger 16, also referred to as a turbocharger. Exhausted gases from the dedicated EGR cylinder flow through EGR valve 60 and an EGR cooler 62, where they are cooled, before they flow back into intake manifold 30. In the present arrangement, about 25% of the exhaust gases are recirculated through EGR cooler 62. Of course, the dedicated EGR cylinder may be larger (or smaller) than the non-dedicated EGR cylinders to increase (decrease) the percentage volume of exhaust gases for recirculation. Dedicated EGR cylinders may also have different bore size, stroke, and compression ratio, which differences may require different ignition aid energy tuning. The volume of gases may be controlled by EGR valve 62. In a variation of the present embodiment in which two of six combustion cylinders are dedicated EGR cylinders, about 33% of the exhaust gases may be recirculated. Since the dedicated EGR cylinders determine the recirculation gas volume, it is advantageous to control dedicated EGR cylinders differently than non-dedicated EGR cylinders. Dedicated EGR cylinders may be larger (or smaller) than non-dedicated EGR cylinders, and may receive a different air/fuel mixture than non-dedicated EGR cylinders. Consequently, it is advantageous to independently control the ignition energy of the ignition aid plugs of the dedicated and non-dedicated EGR cylinders to achieve a desired performance tailored to the characteristics of the cylinders, the combustion engine, the load coupled to the combustion engine, and the application in which the combustion engine is used.

Combustion engine 10 further comprises an air filter 12, an air input throttle 14 on one side of air-compressor 16, and an exhaust throttle 18 on the opposite side. ECM 110 transmits throttle control signals 102 to control air input throttle 14 and exhaust throttle 18, to control the volume and pressure of gases entering and leaving combustion engine 10. Filtered air compressed by air-compressor 16 is cooled by a charge-air cooler 20. Cooled fresh air gases and cooled recirculated exhaust gases flow in a conduit 22 to intake manifold 30, from where the mixture of fresh gases and recirculated gases is provided to combustion cylinders 42, 44, 46, and 48.

ECM 110 determines a plurality of operating conditions of combustion engine 10 with sensor signals received via one or more signal links 108 from a plurality of sensors, or sensor modules, such as pressure, temperature, oxygen, flow, mass, knock, vibration and any other suitable sensors. In FIG. 1, temperature sensors are identified by the letter T following a number corresponding to the temperature of the part being sensed. Thus, temperature sensor 12T senses the temperature of air entering filter 12, temperature sensor 50T senses the temperature of exhaust manifold 50, and temperature sensor 30T senses the temperature of intake manifold 30. Other sensors are similarly identified. Altitude (pressure) sensor 12P senses the ambient pressure. Pressure and temperature sensors (not shown) may also be provided to sense the pressure and temperatures of charge-air cooler 20 and EGR cooler 62. Also shown are intake and exhaust manifold pressure sensors 30P and 50P, exhaust manifold oxygen sensor 50O, and dedicated EGR exhaust pressure sensor 40P, temperature sensor 40T, and oxygen sensor 40O. Exhaust manifold 50 temperature and oxygen parameters represent the temperature and oxygen of non-dedicated EGR cylinders. Additional sensors include charge-air cooler mass-flow sensor 20M, EGR cooler flow sensor 62F, and intake manifold intake flow sensor 22F. Pressure sensors (not shown) may also be provided to measure the pressure inside each fuel injector to control fuel injection. Pressure sensors 80P, 82P, 84P, and 86P are provided to measure in-cylinder pressures, and knock sensors 80K, 82K, 84K, and 86K are provided to measure knock in each cylinder. Knock sensors may sense vibration, noise, or any other variable indicative of cylinder knock. In some embodiments, knock sensors 80K, 82K, 84K, and 86K comprise accelerometers. Data corresponding to sensor signals from knock sensors 80K, 82K, 84K, and 86K may be sent to ignition control unit 130 by ECM 110. Alternatively, signals from knock sensors 80K, 82K, 84K, and 86K may be provided to ignition control unit 130.

Combustion engine 10 further comprises (not shown) a fuel supply system configured to supply fuel to fuel injectors 70, 72, 74, and 76. ECM 110 may then individually control the fuel supplied to each combustion cylinder based on a desired air/fuel (A/F) ratio for each combustion cylinder. The ignition energy for each combustion cylinder may be based on the desired A/F ratio, an EGR fraction, a mode of operation of the engine, a type of air-charger, and any other characteristic and desired performance of the combustion engine.

Figure 2:
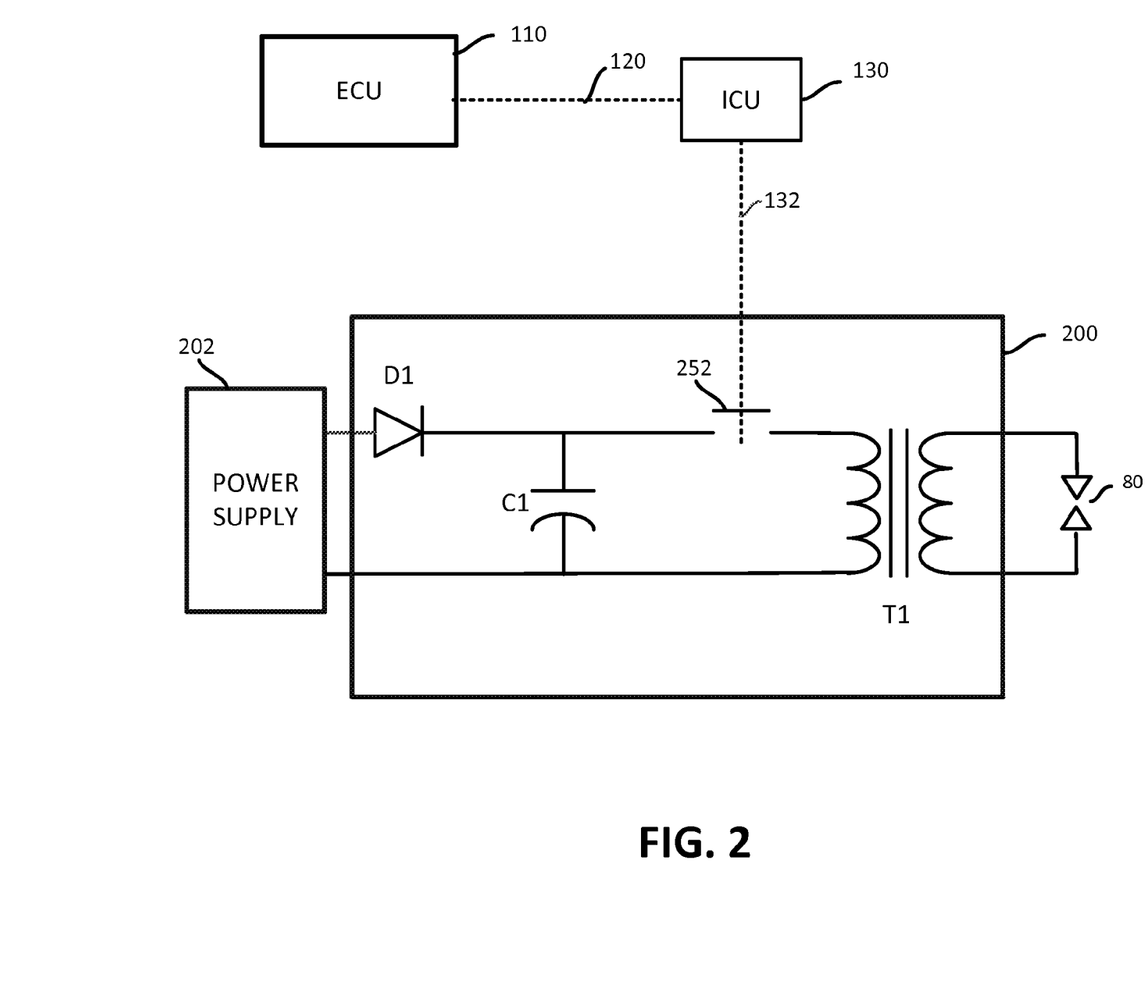
FIG. 2 is a schematic diagram of an embodiment of an engine management module coupled to an ignition management module.

FIG. 2 is a circuit/block diagram of an embodiment of a circuit configured to provide ignition energy to an ignition aid plug. As shown therein, ECM 110 provides ignition energy control signals 120 to ICU 130. In turn, ICU 130 generates switching control signals 232 from ignition energy control signals 120, which are provided to operate a switch 252 in a switching circuit 200 powered by a power supply 202. Energy from power supply 202 passes through a diode D1 to charge a capacitor C1. Activation of switch 252 by ICU 130 causes switch 252 to close, enabling the charge in capacitor C1 to induce power in the secondary winding of a transformer T1 which is coupled to, in this example, ignition aid plug 80. Switching circuit 200 enables generation of higher voltages and currents in the ignition aid plugs than is available from power supply 202, thus enabling higher magnitude of the ignition energy provided to ignition aid plug 80. The voltage, current, and duration of the ignition energy provided by switching circuit 200 may be controlled during each ignition event. A plurality of ignition energy pulses may be provided, each pulse having different voltage, current, and duration characteristics. A combination of pulses may be provided to generate individualized ignition energy functions during ignition events.

Figure 3:
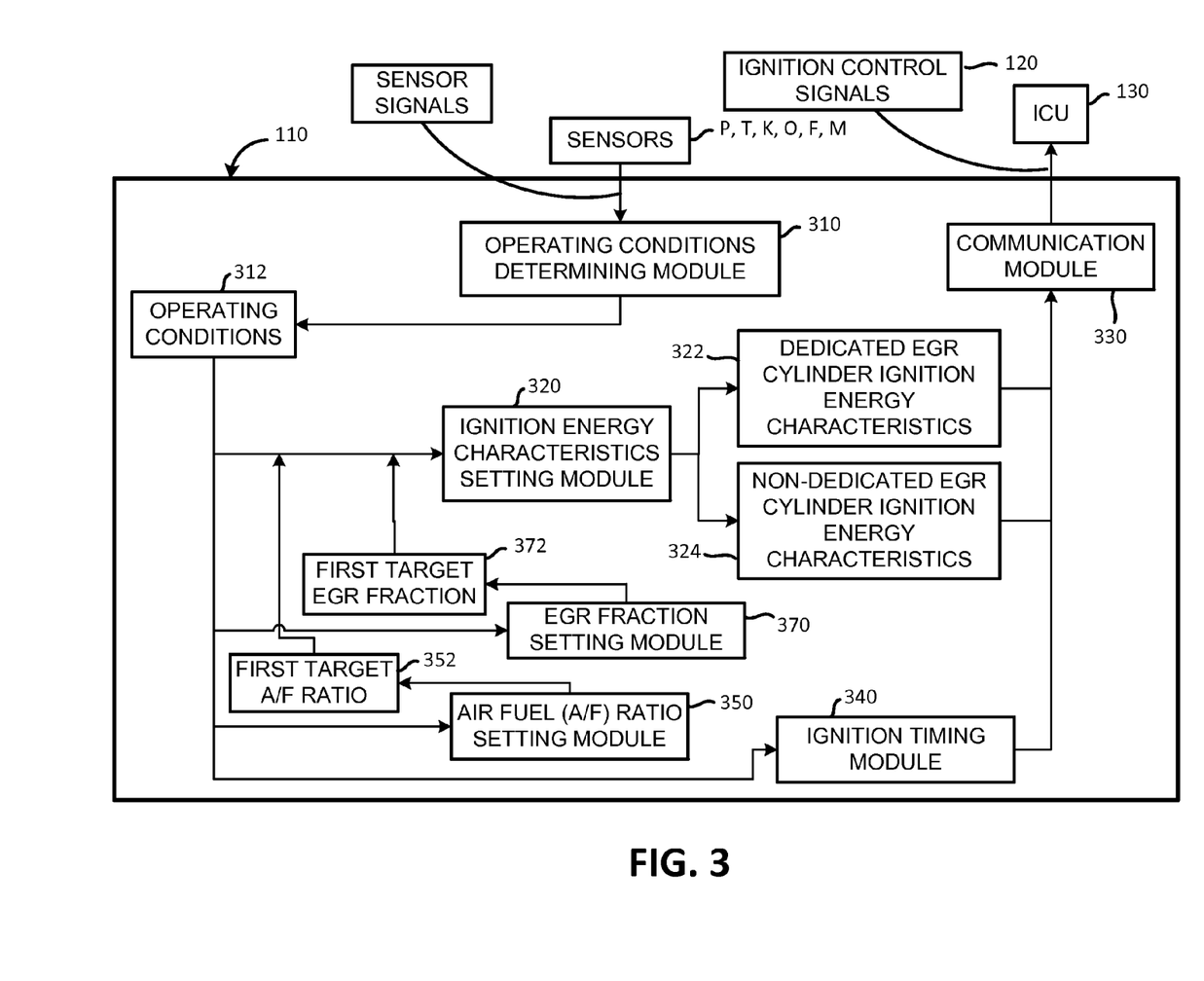
FIG. 3 is a block diagram of another embodiment of an engine management module.

FIG. 3 is a block diagram of an embodiment of ECM 110. The embodiment of ECM 110 disclosed herein may be utilized by combustion engine 10 and may operate in conjunction with IGU 130 as disclosed in FIG. 2. ECM 110 comprises an operating conditions determining module 310 structured to determine operating conditions 312 of a combustion engine using sensor signals, the combustion engine including at least one dedicated exhaust gas recirculation (EGR) cylinder, a non-dedicated EGR cylinder, and ignition aid plugs configured to aid ignition in the at least one dedicated EGR cylinder and the non-dedicated EGR cylinder. ECM 110 further comprises an ignition energy characteristics setting module 320 structured to set ignition energy characteristics 322, 324 for the dedicated EGR cylinder and the non-dedicated EGR cylinder based on operating conditions 312. As used herein, ignition characteristics 322, 324 include any characteristics of ignition energy except ignition timing. Ignition timing may be determined by an ignition timing module 340, as described below. Ignition energy characteristics 322, 324 include at least one of magnitude of energy, current, voltage, and ignition energy duration. Ignition energy characteristics 322, 324 may include intra-event timing characteristics, for example timing between voltage pulses within an ignition event, but such timing characteristics do not include ignition timing, which as described below refers to the timing of ignition events and not to timing within events. At least one characteristic of ignition energy characteristics 324 for the non-dedicated EGR cylinder is different than a corresponding ignition energy characteristic 322 for the dedicated EGR cylinder. ECM 110 further comprises a communication module 330 structured to transmit ignition control signals 120 to ignition control unit 130. Ignition control signals 120 are based on ignition energy characteristics 322, 324 set by ignition energy setting module 320.

In a variation of the present embodiment, engine control module 110 further comprises an ignition timing module 340 structured to set ignition timing for the at least one EGR cylinder and the non-dedicated EGR cylinder. Ignition timing refers to the timing of ignition of each cylinder relative to a master timing event, such as a degree of rotation of a camshaft of the combustion engine. Generally, each cylinder is timed so that ignition events are evenly distributed over a rotation or two of the camshaft. However, timing for each cylinder may be varied by a degree or more, or a fraction thereof, based on the operating conditions and combustion engine configuration, for example to balance the torque generated by the cylinders and applied to a crankshaft of the combustion engine. Ignition events may include a main ignition event and pre and post ignition events occurring before and after, respectively, the main ignition event.

In a variation of the present embodiment, engine control module 110 further comprises an A/F ratio setting module 350 structured to set a first target A/F ratio 352 for the dedicated EGR cylinder. Ignition energy characteristics setting module 350 is further structured to set ignition energy characteristics 322 for the dedicated EGR cylinder based on first target A/F ratio 352, in addition to other operating characteristics.

In one example of the present variation, the at least one dedicated EGR cylinder comprises two dedicated EGR cylinders, and A/F ratio setting module 350 is further structured to set a second target A/F ratio. Ignition energy characteristics setting module 320 is further structured to set ignition energy characteristics 322 for the second dedicated EGR cylinder based on the second target A/F ratio. Advantageously, two dedicated EGR cylinders provide the capability to control the overall amount of exhaust gas recirculation while also improving efficacy of the dedicated EGR cylinder components. In a further example, the first target A/F ratio is richer than the second target A/F ratio during a first time period, and the second target A/F ratio is richer than the first target A/F ratio during a second time period. Running lean can clean the combustion cylinder, ignition aid plug, piston, and fuel injector valves by removing carbon build-up, thus increasing their effectiveness. Alternating the A/F ratios during the first and second time periods enables cleaning of one dedicated EGR cylinder while maintaining an overall A/F ratio for the pair, and then cleaning the other dedicated EGR cylinder. The duration of the first and second periods may be determined experientially. Of course, there may be a third period during which both dedicated EGR cylinders run rich, stoichiometric, or lean. For instance, both dedicated EGR cylinders may run rich when the combustion engine is started. In yet another example, A/F ratio setting module 350 is further structured to set a stoichiometric A/F ratio for the non-dedicated EGR cylinder, and ignition energy characteristics setting module 320 is further structured to set ignition energy characteristics 324 for the non-dedicated EGR cylinder based the stoichiometric A/F ratio.

In another variation of the present embodiment, ECM 110 further comprises an EGR fraction setting module 370 structured to set a first target EGR fraction 372 and determine an EGR fraction. The EGR fraction may be determined based on sensed values obtained from the sensors as described generally above. For example, one or more oxygen sensors such as 30O, 40O, or 50O may be used to determine the EGR fraction in any manner known the art. Ignition energy characteristics setting module 320 is further structured to set ignition energy characteristics 322, 324 for the dedicated EGR cylinder based on a difference between first target EGR fraction 372 and the determined EGR fraction. EGR fraction setting module 370 may receive first target A/F ratio 352 and set first target EGR fraction 372 based thereon.

In a yet further variation of the present embodiment, ignition energy characteristics setting module 320 is further structured to vary ignition energy characteristics 322, 324 to deactivate the ignition aid plug of the non-dedicated EGR cylinder in a start mode and to activate the ignition aid plug of the non-dedicated EGR cylinder in a run mode. In this manner, ignition energy characteristics setting module 320 can delay ignition in the non-dedicated EGR cylinders until they reach a predetermined temperature or desired recirculated/fresh gas mix, for example. In another example, one or more of the sensors are structured to sense a characteristic indicative of an amount of recirculated exhaust gas, and ignition energy characteristics setting module 320 is further structured to switch from the start mode to the run mode responsive to the amount of recirculated exhaust gas exceeding a predetermined amount. The amount of recirculated exhaust gas may be determined based on signals from sensors located in a path between block 40 and intake manifold 30, such as 40O, 62F, 22F, and 30O. Ignition energy characteristics may also be varied during or following a shutdown of the combustion engine so as to enhance EGR scavenging.

In variations of the present embodiment, ECM 110 comprises EGR fraction setting module 370 and A/F ratio setting module 350. EGR fraction setting module 370 and A/F ratio setting module 350 cooperate to establish desired A/F ratios for the dedicated and non-dedicated EGR cylinders, may establish different A/F ratios for each dedicated EGR cylinder as described above, and may establish ignition energy characteristics for each cylinder based on the EGR fraction and corresponding A/F ratios for each cylinder.

The configuration shown in FIG. 1 thus allows for ECM 110 to adjust one or more ignition energy characteristics 322, 324 to be used for controlling one or more combustion cylinders 42, 44, 46, and 48 in response to one or more engine operating conditions. For example, an EGR fraction and an EGR quality metric are engine operating conditions that may be ascertained based on the oxygen sensor 40O and EGR flow rate sensor 62F, among other sensors distributed in combustion engine 10. By further way of illustration, the in-cylinder pressure is an engine operating condition that may be detected based on in-cylinder pressure sensors 80P, 82P, 84P, and 86P. Likewise, the knock detection metric is an engine operating condition that may be determined from knock detection sensors 80K, 82K, 84K, and 86K.

In some embodiments, ECM 110 can, based on the temperature, pressure, and flow rate sensors described above, determine other engine operating conditions. For example, from the information gleaned from the in-cylinder pressure sensors 80P, 82P, 84P, and 86P and additional data inputs, ECM 110 can determine an in-cylinder temperature. In this manner, ECM 110 can account for engine operating conditions including an air/fuel ratio, a misfire detection, a cylinder balancing determination, a charge flow, an intake air temperature, a determination based on transient conditions that may be determined based on any combination of sensed values and/or estimated values.

Figure 4:
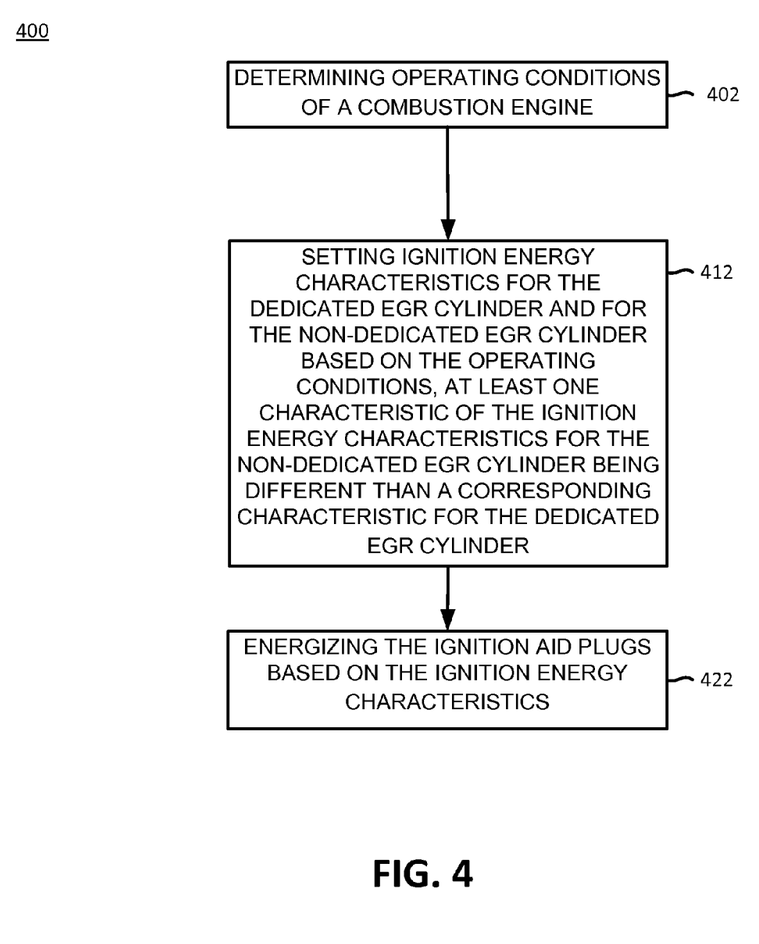
FIG. 4 is a flowchart of an embodiment of a method for managing ignition in a combustion engine.

FIG. 4 depicts a flowchart 400 of a method for energy ignition management. The method may be implemented by ECM 110 in combustion engine 10. The method begins at 402, with determining operating conditions of a combustion engine including at least one dedicated EGR cylinder, a non-dedicated EGR cylinder, and ignition aid plugs configured to aid ignition in the at least one dedicated EGR cylinder and the non-dedicated EGR cylinder. As discussed above, ignition aid plugs include spark-plugs and glow-plugs.

The method continues at 412, with setting ignition energy characteristics for the dedicated EGR cylinder and for the non-dedicated EGR cylinder based on the operating conditions. The ignition energy characteristics including at least one of magnitude of energy, current, voltage, and ignition energy duration. The ignition energy characteristics do not include ignition timing. At least one characteristic of the ignition energy characteristics for the non-dedicated EGR cylinder is different than a corresponding characteristic for the dedicated EGR cylinder. For example, the amount of ignition energy may differ, or the energy may be the same but may be distributed over a different duration or in a different timing pattern. In a variation of the present embodiment, the method further comprises setting ignition timing characteristics. Ignition timing characteristics may be based on the position of the camshaft or any other indication of the timing of the engine. The ignition timing for each cylinder, dedicated and non-dedicated, may also be determined based on the operating conditions of the engine, although not necessarily the conditions used to determine ignition energy characteristics.

The present embodiment of the method continues at 422, with energizing the ignition aid plugs based on the ignition energy characteristics. The ignition energy characteristics for the non-dedicated EGR cylinder may also be applied to all the non-dedicated EGR cylinders.

In variations of the present embodiment, the method further comprises setting a first target A/F ratio for the dedicated EGR cylinder; and setting the ignition energy characteristics for the dedicated EGR cylinder based on the first target A/F ratio.

In variations of the present embodiment, the at least one dedicated EGR cylinder comprises two dedicated EGR cylinders, and the method further comprises setting a second target A/F ratio; setting ignition energy characteristics for the second dedicated EGR cylinder based on the second target A/F ratio; energizing the ignition aid plug of one of the two dedicated EGR cylinders based on the ignition energy characteristics for the first dedicated EGR cylinder; and energizing the ignition aid plug of the other of the two dedicated EGR cylinders based on the ignition energy characteristics for the second dedicated EGR cylinder. In one example, the first target A/F ratio is richer than the second target A/F ratio during a first time period, and the second target A/F ratio is richer than the first target A/F ratio during a second time period. For example, the first target A/F ratio may be rich during the first time period and lean during the second time period. The first and second time periods may be sufficient to clean the particular cylinder and fuel injector by running the cylinder lean. While the duration may vary from engine to engine, the determination that the cylinder and fuel injector are cleaned is determinable based on the operation conditions. For example, oxygen and knock sensors may be monitored to determine a change in the combustion of the cylinders, the change being indicative of improved combustion.

In a further example, the method comprises setting a stoichiometric A/F ratio for the non-dedicated EGR cylinder; and setting the ignition energy characteristics for the non-dedicated EGR cylinder based on the stoichiometric A/F ratio. Thus, in combination with the preceding examples, dedicated EGR cylinders may run rich or lean while the non-dedicated EGR cylinders run stoichiometrically. Of course, dedicated EGR cylinders may also run stoichiometrically between the first and second time periods.

In variations of the present embodiment, the method further comprises setting a first target EGR fraction; and setting the ignition energy characteristics for the dedicated EGR cylinder based on a difference between the first target EGR fraction and a determined EGR fraction. A dedicated EGR cylinder can produce a maximum amount of exhaust gas that is regenerated through all the cylinders. The composition of the exhaust gas determines the EGR fraction. Once the ECU determines a desired EGR fraction, the ignition energy characteristics for the ignition aid plug of the cylinder can be varied in a feedback loop based on the error between the first target EGR fraction and the determined EGR fraction, which may be determined based on sensor signals as described above.

In variations of the present embodiment, the method further comprises varying the ignition energy characteristics in response to a combustion engine load change. As is known in the art, a combustion engine coupled to a transmission may be mapped to tailor its torque output to the characteristics of the transmission and desired performance. As the load on the engine changes, the engine mapping may be used to determine desired ignition characteristics, and the ignition energy characteristics may be adapted accordingly to produce the desired ignition characteristics and resulting torque output. In one example, varying the ignition energy characteristics comprises deactivating the ignition aid plug for the non-dedicated EGR cylinder in a start mode and activating the ignition aid plug for the non-dedicated EGR cylinder in a run mode. Further, the dedicated EGR cylinders may be run rich in the start mode to increase the EGR fraction. This may be done to more rapidly heat the non-dedicated EGR cylinder during a start mode. As the cylinders warm up, ignition characteristics change, and the EGR fraction may change, thus the ignition energy characteristics may be used to refine operation of the combustion engine. The start mode may last a second or longer, depending engine temperature, compression ratios etc. In a further example, varying the ignition energy characteristics further comprises switching from the start mode to the run mode responsive to a predetermined amount of recirculated exhaust gas. The predetermined amount of recirculated exhaust gas may be predetermined based on nominal operating conditions, which may also be used to set the duration of the start mode for different conditions. A table may be used to correlate operating conditions to start mode duration. Thus, the predetermined amount of recirculated exhaust gas is not necessarily a set amount, but can be an amount set for each of a plurality of sets of operating conditions.

The ignition energy may be varied based also on the regions of the EGR map. At low load, it is desirable to run lean to reduce the EGR fraction. As load increases, the A/F ratio also increases so the ignition energy may be adjusted accordingly. The ignition energy may also be adjusted based on the type of catalyst used by the regeneration system, and the desired temperature for the catalyst at different points in time.

In variations of the present embodiment, the method further comprises varying the ignition energy characteristics for the dedicated EGR cylinder based on a type of turbocharger or air-charger of the combustion engine. The type of air-charger can affect the temperature and pressure of the charged air and thus affect the ignition characteristics. The performance of the cylinders for a given type of air-charger can also be mapped so that ignition engine characteristics can be tailored to the performance of the air-charger. Exemplary air-chargers include wastegate, asymmetric turbine housing, and variable geometry turbochargers.

One of skill in the art, having the benefit of the disclosures herein, will recognize that the processing subsystem 100 and the ECM 110 are structured to perform operations that improve various technologies and provide improvements in various technological fields. Without limitation, example and non-limiting technology improvements include improvements in combustion performance of internal combustion engines, improvements in emissions performance, after-treatment system regeneration, engine torque generation and torque control, engine fuel economy performance, improved durability of exhaust system components for internal combustion engines, and engine noise and vibration control. Without limitation, example and non-limiting technological fields that are improved include the technological fields of internal combustion engines, fuel systems therefore, after-treatment systems therefore, air handling devices therefore, and intake and exhaust devices therefore.

While this specification contains specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in a particular order, this should not be understood as requiring that such operations be performed in the particular order shown or in sequential order, or that all operations be performed, to achieve desirable results. Moreover, the separation of various aspects of the implementations described above should not be understood as requiring such separation in all implementations, and it should be understood that the described methods can generally be integrated in a single application or integrated across multiple applications.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Thus, particular implementations of the invention have been described. Other implementations are within the scope of the following claims. In some cases, actions recited in the claims may be performed in a different order and still achieve desirable results. In addition, the depictions in the accompanying figures do not necessarily require a particular order or sequential order.

What is claimed is:
1. A method for ignition energy management, the method comprising:

determining operating conditions of a combustion engine including at least one dedicated exhaust gas recirculation (EGR) cylinder, a non-dedicated EGR cylinder, and ignition aid plugs configured to aid ignition in the at least one dedicated EGR cylinder and the non-dedicated EGR cylinder;

setting ignition energy characteristics for the at least one dedicated EGR cylinder and for the non-dedicated EGR cylinder based on the operating conditions, the ignition energy characteristics including at least one of magnitude of energy, current, voltage, waveform shape, or ignition energy duration, and excluding timing of ignition events, at least one characteristic of the ignition energy characteristics for the non-dedicated EGR cylinder being different than a corresponding characteristic for the at least one dedicated EGR cylinder, wherein the at least one dedicated EGR cylinder comprises two dedicated EGR cylinders including a first dedicated EGR cylinder and a second dedicated EGR cylinder;

setting a first target air/fuel (A/F) ratio;

setting a second target A/F ratio;

setting the ignition energy characteristics for the first dedicated EGR cylinder based on the first target A/F ratio;

setting the ignition energy characteristics for the second dedicated EGR cylinder based on the second target A/F ratio;

energizing the ignition aid plug of one of the two dedicated EGR cylinders based on the ignition energy characteristics for the first dedicated EGR cylinder; and energizing the ignition aid plug of the other of the two dedicated EGR cylinders based on the ignition energy characteristics for the second dedicated EGR cylinder.

2. The Method of claim 1, further comprising:
setting timing of ignition events.

3. The Method of claim 1, wherein the first target A/F ratio is richer than the second target A/F ratio during a first time period, and the second target A/F ratio is richer than the first target A/F ratio during a second time period.

4. The Method of claim 3, wherein the first target A/F ratio is rich during the first time period and lean during the second time period.

5. The Method of claim 4, further comprising:
setting a stoichiometric A/F ratio for the non-dedicated EGR cylinder; and
setting the ignition energy characteristics for the non-dedicated EGR cylinder based on the stoichiometric A/F ratio.

6. The Method of claim 1, further comprising:
setting a first target EGR fraction; and
setting the ignition energy characteristics for the at least one dedicated EGR cylinder based on a difference between the first target EGR fraction and a determined EGR fraction.

7. The Method of claim 1, further comprising: varying the ignition energy characteristics in response to a combustion engine load change.

8. The Method of claim 7, wherein varying the ignition energy characteristics comprises deactivating the ignition aid plug for the non-dedicated EGR cylinder in a start mode and activating the ignition aid plug for the non-dedicated EGR cylinder in a run mode.

9. The Method of claim 8, wherein varying the ignition energy characteristics further comprises switching from the start mode to the run mode responsive to a predetermined amount of recirculated exhaust gas.

10. The Method of claim 1, further comprising setting the ignition energy characteristics for the at least one dedicated EGR cylinder based on a type of turbocharger of the combustion engine.

11. The Method of claim 1, further comprising: starting the combustion engine on the at least one dedicated EGR cylinder without the non-dedicated EGR cylinder.

12. A combustion engine comprising:
at least one dedicated exhaust gas recirculation (EGR) cylinder;
a non-dedicated EGR cylinder;
ignition aid plugs structured to aid ignition in the at least one dedicated EGR cylinder and the non-dedicated EGR cylinder;
a plurality of sensors;
an ignition control unit structured to energize the ignition aid plugs based on ignition control signals; and
an engine control module electronically coupled to the sensors and to the ignition control unit, the engine control module including:
an operating conditions determining module structured to determine operating conditions of the combustion engine using signals from the sensors;
an air/fuel (A/F) ratio setting module structured to set a first target A/F ratio and a second target A/F ratio;
an ignition energy setting module structured to set ignition energy characteristics for the at least one dedicated EGR cylinder and the non-dedicated EGR cylinder based on the operating conditions, the ignition energy characteristics including at least one of magnitude of energy, current, voltage, waveform shape, or ignition energy duration, and excluding timing of ignition events, at least one characteristic of the ignition energy characteristics for the non-dedicated EGR cylinder being different than a corresponding ignition energy characteristic for the at least one dedicated EGR cylinder, wherein the at least one dedicated EGR cylinder comprises two dedicated EGR cylinders including a first dedicated EGR cylinder and a second dedicated EGR cylinder, and wherein the ignition energy characteristics for the first dedicated EGR cylinder are based on the first target A/F ratio and the ignition energy characteristics for the second dedicated EGR cylinder are based on the second target A/F ratio; and
a communication module structured to transmit the ignition control signals to the ignition control unit to energize the ignition aid plug of one of the two dedicated EGR cylinders based on the ignition energy characteristics for the first dedicated EGR cylinder and to energize the ignition aid plug of the other of the two dedicated EGR cylinders based on the ignition energy characteristics for the second dedicated EGR cylinder, the ignition control signals based on the ignition energy characteristics set by the ignition energy setting module.

13. The combustion engine of claim 12, further comprising:
an ignition timing module structured to set timing of ignition events for the at least one EGR cylinder and the non-dedicated EGR cylinder.

14. The combustion engine of claim 12, wherein the first target A/F ratio is richer than the second target A/F ratio during a first time period, and the second target A/F ratio is richer than the first target A/F ratio during a second time period.

15. The combustion engine of claim 14, wherein the A/F ratio setting module is further structured to set a stoichiometric A/F ratio for the non-dedicated EGR cylinder, and the ignition energy characteristics setting module is further structured to set the ignition energy characteristics for the non-dedicated EGR cylinder based the stoichiometric A/F ratio.

16. The combustion engine of claim 12, the engine control module further comprising an EGR fraction setting module structured to set a first target EGR fraction and determine an EGR fraction, the ignition energy characteristics setting module further structured to set the ignition energy characteristics for the at least one dedicated EGR cylinder based on a difference between the first target EGR fraction and the determined EGR fraction.

17. The combustion engine of claim 12, wherein the ignition energy characteristics setting module is further structured to vary the ignition energy characteristics to deactivate the ignition aid plug of the non-dedicated EGR cylinder in a start mode and to activate the ignition aid plug of the non-dedicated EGR cylinder in a run mode.

18. The combustion engine of claim 17, wherein one of the sensors is structured to sense a characteristic indicative of an amount of exhaust gas recirculated through the non-dedicated EGR cylinder, the ignition energy characteristics setting module further structured to switch from the start mode to the run mode responsive to the amount of exhaust gas exceeding a predetermined amount.

19. The combustion engine of claim 12, the combustion engine further comprising a turbocharger, the ignition energy characteristics setting module further structured to set the ignition energy characteristics for the at least one dedicated EGR cylinder based on a type of the turbocharger.

20. An engine control module comprising:
an operating conditions determining module structured to determine operating conditions of a combustion engine using sensor signals, the combustion engine including at least one dedicated exhaust gas recirculation (EGR) cylinder, a non-dedicated EGR cylinder, and ignition aid plugs configured to aid ignition in the at least one dedicated EGR cylinder and the non-dedicated EGR cylinder;
an air/fuel (A/F) ratio setting module structured to set a first target A/F ratio and a second target A/F ratio;
an ignition energy setting module structured to set ignition energy characteristics for the at least one dedicated EGR cylinder and the non-dedicated EGR cylinder based on the operating conditions, the ignition energy characteristics including at least one of magnitude of energy, current, voltage, waveform shape, or ignition energy duration, and excluding timing of ignition events, at least one characteristic of the ignition energy characteristics for the non-dedicated EGR cylinder being different than a corresponding ignition energy characteristic for the at least one dedicated EGR cylinder, wherein the at least one dedicated EGR cylinder comprises two dedicated EGR cylinders including a first dedicated EGR cylinder and a second dedicated EGR cylinder, and wherein the ignition energy characteristics for the first dedicated EGR cylinder are based on the first target A/F ratio and the ignition energy characteristics for the second dedicated EGR cylinder are based on the second target A/F ratio; and
a communication module structured to transmit ignition control signals to an ignition control unit to energize the ignition aid plug of one of the two dedicated EGR cylinders based on the ignition energy characteristics for the first dedicated EGR cylinder and to energize the ignition aid plug of the other of the two dedicated EGR cylinders based on the ignition energy characteristics for the second dedicated EGR cylinder, the ignition control signals based on the ignition energy characteristics set by the ignition energy setting module.

21. The engine control module of claim 20, wherein the first target A/F ratio is richer than the second target A/F ratio during a first time period, and the second target A/F ratio is richer than the first target A/F ratio during a second time period.

22. The engine control module of claim 20, the engine control module further comprising an EGR fraction setting module structured to set a first target EGR fraction and determine an EGR fraction, the ignition energy characteristics setting module further structured to set the ignition energy characteristics for the dedicated EGR cylinder based on a difference between the first target EGR fraction and the determined EGR fraction.

23. The engine control module of claim 20, wherein the ignition energy characteristics setting module is further structured to vary the ignition energy characteristics to deactivate the ignition aid plug of the non-dedicated EGR cylinder in a start mode and to activate the ignition aid plug of the at least one non-dedicated EGR cylinder in a run mode.

* * * * *